Figure 1:
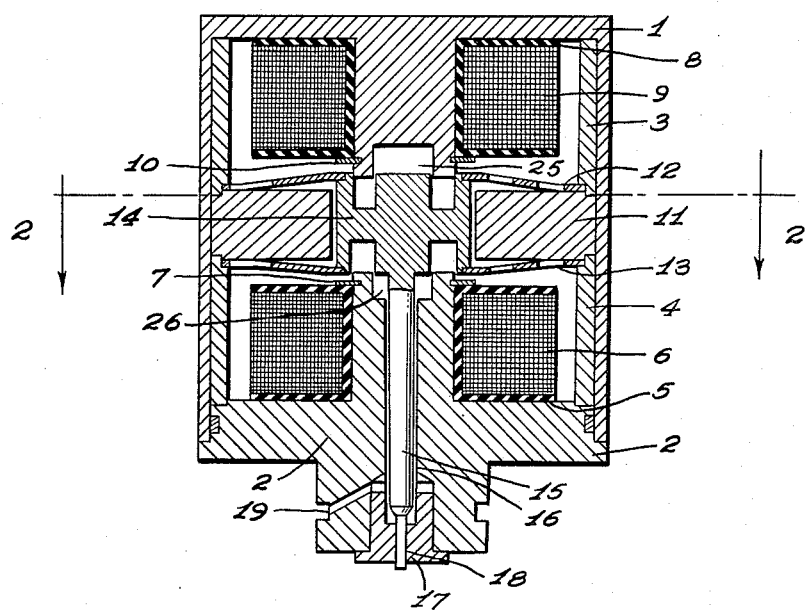

Sept. 28, 1954     L. A. LINDBLAD     2,690,529

SUSPENSION ARRANGEMENT FOR MOVABLE MEMBERS

Filed Feb. 28, 1951

INVENTOR

LARS ALFRED LINDBLAD

BY

ATTORNEY

Patented Sept. 28, 1954

2,690,529

UNITED STATES PATENT OFFICE 2,690,529

SUSPENSION ARRANGEMENT FOR MOVABLE MEMBERS

Lars A. Lindblad, Grondal, Sweden, assignor to Aktiebolaget Bofors, Bofors, Sweden, a Swedish corporation Application February 28, 1951, Serial No. 213,117

Claims priority, application Sweden March 1, 1950

8 Claims. (Cl. 317—192)

This invention is concerned with and has for one of its objects a suspension arrangement for maintaining one or more linearly movable member or members in a predetermined position relative to a stationary portion and returning the member or members into said position upon linear displacement of the member or members out of the said position.

More particularly, the invention is concerned with maintaining one or more axially movable cylindrical member or members in a predetermined axial position relative to a stationary member and returning the member or members into the said position after a displacement of the same.

Suspension arrangements of the general type, above referred to, are useful in various fields of engineering. A particularly advantageous field of application are electromagnetic means, such as relays, with linear attraction of the armature relative to the core. With relays of this type, a suspension arrangement according to the invention is employed to maintain the armature in a selected axial position relative to the core or between two cores and to return the armature into the said position after attraction by the core or either of the cores. Such positioning of the armature is highly desirable for many switching arrangements.

A more specific object of the invention is to superimpose upon the straight or linear movement of the armature or other member or members toward or away from the core or other stationary member a limited rotary movement.

Other objects, features and advantages of the invention will be pointed out hereinafter and set forth in the appended claims forming part of the application.

In the accompanying drawing a now preferred embodiment of the invention is shown by way of illustration and not by way of limitation.

Figure 2:
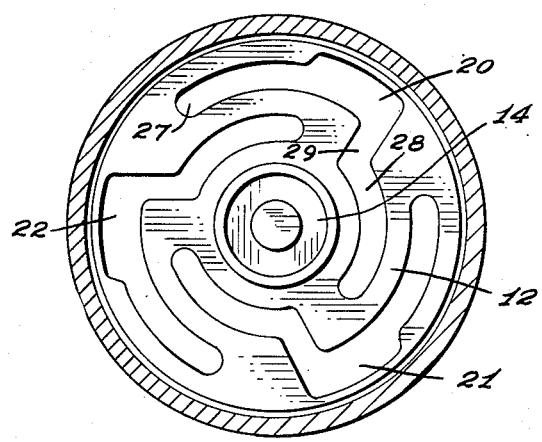

In the drawing:

Fig. 1 is a longitudinal section of an electromagnetic device equipped with a suspension arrangement according to the invention; and Fig. 2 is the cross-section of the device taken on line 2—2 of Fig. 1.

Referring now to the figures in detail, the electromagnetic device according to Figs. 1 and 2 which is shown as a relay comprises a substantially cylindrical housing 1 open on one end. The open end of housing 1 is closed by a cover 2. The housing and the cover are each provided with a central projection 1' and 2' respectively. Both the housing and the cover and also the projections 1' and 2' respectively thereof, are made of magnetizable material so that the projections 1' and 2' form the cores of the relay. Core 1' supports a substantially U-shaped bearer 8 in which a relay coil 9 is inserted. Similarly, core 2' supports a substantially U-shaped coil bearer 5 in which a second relay coil 6 is fitted. The coil bearers 8 and 5 may be secured in position by disks or washers 10 and 7. There is provided in the pole face of each core an axially extended substantially cylindrical recess 25 and 26 respectively. These recesses serve to guide an armature 14 common to both cores in axial direction. Armature 14 is extended by a rod 15 fitted with play in an axial bore of core 2' and cover 2. The free end of rod 15 is shouldered to form a bearing pin 18 journalled for rotary and axial movement in a plug 17 tightly fitted in cover 2. A bore or channel 19 which may be upwardly slanted communicates with a space above plug 17 (as seen on the figure) and, hence, also with bore 16. The interior of the hereinabove described structure may be filled with oil through channel 19.

Armature 14 is further axially guided by a ring 11 also made of magnetizable material and held in position by liners 3 and 4 in the form of cylindrical sleeves. As will be noted, armature 14 is fitted loosely in the central opening of ring 11.

For the purpose of suspending the armature in a predetermined axial position relative to cores 1' and 2', a pair of disks or plates 12 and 13, preferably made of resilient or flexible material, are provided. These disks are ring-shaped and the inner circumference of the disks is connected to axial flanges of armature 14. The outer circumference of the disks is secured against axial and radial or transverse movement by ring 11 and liners 3 and 4 as can clearly be seen on Fig. 1.

Fig. 1 also shows that the two disks are dished in opposite directions. The disks are originally flat and pressed into the dished shape during the assembly of the device. As a result of such dishing possible internal tensions of the disks or plates developed during the manufacture of the disks are removed or at least rendered ineffective.

As can best be seen on Fig. 2, each disk is provided with three apertures 21, 22 and 23. Each of these apertures has an outer circumferential elongated section 27 and an inner circumferential elongated section 28. The two circumferential elongated sections are staggered and joined by a section 29 extending substantially in a radial direction. As will be noted, each outer circumferential section 27 of an aperture is disposed in radial alignment with the inner circumferential section of another aperture. The purpose of the apertures 20, 21 and 22 is to cause a certain distortion of the disks when armature 14 is axially displaced. This distortion, in turn, effects a limited rotary movement of the armature as will be more fully explained hereinafter.

The device, as herein before described, operates as follows:

Let it be assumed that coil 6 is energized, then armature 14 will be attracted downwardly against the springiness of disks 12 and 13. Due to the aforementioned distortion of the disks, as caused by the apertures therethrough, the armature will not only perform an axial downward movement but also a limited rotary movement. In other words, the motion imparted to the armature is similar to the motion of a corkscrew, the rotary motion superimposed by the two disks upon the axial movement of the armature being equal in angle and direction. When coil 6 is deenergized, armature 14 returns into its original axial position relative to the core faces by making the same corkscrew movement though in opposite direction.

In case coil 9 is energized armature 14 is attracted upwardly and moves into its attracted position by the aforementioned corkscrew motion and also returns with a corkscrew movement into its rest position.

As will be noted, due to the mounting of disks 12 and 13 the armature and the disks do not move relative to each other in radial direction. It will further be apparent that the same suspension arrangement can also be employed to control the axial position of several axially movable bodies. In case alternating current is used to energize coils 6 and 9, it is advisable to heterodyne the current.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

A device according to the present invention is especially well suited to control the valve of an oil motor. In this application it is very convenient to have the device filled with oil, as the problem of packing will be easier.

What is claimed as new and desired to be secured by Letters Patent is:

1. A suspension arrangement for maintaining a linearly movable member in a predetermined position relative to a stationary reference member and returning the movable member into the said position upon a displacement of the said member, the said arrangement comprising two resilient disks, stationarily mounted support means for the disks supporting the same spaced apart in planes generally transverse to the direction of a linear movement of said movable member, the said support means being fastened to marginal portions of said disks for securing the same against linear and transverse displacements, the said movable member being disposed between the two disks in engagement with the centric portion thereof and having an axial length effecting stressing of the disks into a dished shape in opposite directions, the said disks being similar and each disk having a plurality of elongated, generally circularly extending slots, the remaining portions of the disk material forming a plurality of non-radial arms, corresponding slots and arms of the two disks being situated in axial alignment one with another for causing a deflection of each disk in response to a linear displacement of the movable member relative to said stationary reference member thereby biasing the movable member toward the said predetermined position, and also for causing a rotation of the centric portion of each disk relative to its fixedly held marginal portions thereby superimposing a rotary movement upon said linear displacement of the movable member.

2. A suspension arrangement as defined in claim 1, wherein said movable member has a generally cylindrical configuration, the said disks including a central opening therethrough in which openings the ends of said cylindrical member are fitted for a joint linear and rotary movement of said member and the center portion of said disks.

3. A suspension arrangement as defined in claim 2, wherein said disk slots each comprise two circumferentially elongated sections radially and circumferentially spaced and joined at opposite ends by a section extending approximately in radial direction.

4. A suspension arrangement as defined in claim 3, wherein the outer circumferential section of one slot is disposed in partial radial alignment with the inner circumferential section of another slot.

5. A suspension arrangement as defined in claim 1, wherein said disks are approximately concavely curved one relative to the other.

6. A suspension arrangement according to claim 1, wherein the said stationary reference member is in form of the core of an electromagnetic device, and wherein the said linearly movable member is in form of the armature of the electromagnetic device.

7. A modification of the suspension arrangement according to claim 1 comprising two reference members stationarily mounted in alignment spaced apart, the said linearly movable member being supported between the two stationary members in a predetermined position relative thereto.

8. A suspension arrangement according to claim 7, wherein each of the two facing sides of the two reference members is formed with a recess engaged by said movable member for guiding the displacement of the latter.

References Cited in the file of this patent

UNITED STATES PATENTS

| Number | Name | Date |
| --- | --- | --- |
| 1,503,987 | Demele | Aug. 5, 1924 |
| 1,881,324 | Metcalf | Oct. 4, 1932 |
| 1,930,186 | Swallow | Oct. 10, 1933 |
| 2,227,328 | Steiss | Dec. 31, 1940 |
| 2,348,225 | Petty | May 9, 1944 |
| 2,487,604 | Short | Nov. 8, 1949 |
| 2,516,236 | Moorhead et al. | July 25, 1950 |
| 2,531,905 | Carpenter | Nov. 28, 1950 |

FOREIGN PATENTS

| Number | Country | Date |
| --- | --- | --- |
| 97,864 | Austria | Sept. 10, 1924 |